Jan. 10, 1939.   C. W. NESSELL   2,143,569
TEMPERATURE CONTROL SYSTEM
Filed June 4, 1937   2 Sheets—Sheet 1

Fig.1

Inventor
Clarence W. Nessell
By
George H Fisher
Atty.

Jan. 10, 1939. C. W. NESSELL 2,143,569
TEMPERATURE CONTROL SYSTEM
Filed June 4, 1937 2 Sheets-Sheet 2

Fig. 2

Inventor
Clarence W. Nessell
By
Atty. George H Fisher

Patented Jan. 10, 1939

2,143,569

UNITED STATES PATENT OFFICE 2,143,569

TEMPERATURE CONTROL SYSTEM

Clarence W. Nessell, Dayton, Ohio, assignor to Minneapolis-Honeywell Regulator Company, Minneapolis, Minn., a corporation of Delaware Application June 4, 1937, Serial No. 146,443

15 Claims. (Cl. 126—110)

The present invention relates to a temperature control system and more particularly to one employing a furnace fan system in which means is provided for preventing ignition of the filters.

In modern warm air systems, it is the customary practice to provide a motor operated fan for circulating heat to the space being heated and returning the cooled air to the furnace. In such systems by reason of the forced circulation of air produced by the fan, it is possible to provide filters to clean the air, thus eliminating one of the undesirable features of the early warm air heating systems. The present tendency is moreover to provide a very compact heating plant. This results in the filters often being placed quite close to the furnace proper, usually being located in the return air section of the furnace casing. The placing of the filters close to the furnace, while highly desirable from the standpoint of compactness creates the danger that the filters will become overheated and the combustible material lodged therein will become ignited. This may be very serious since the return air ducts are quite commonly formed in part by the wooden rafters and flooring so that it is very easy for the flames resulting from such ignition to set the house on fire. The overheating of the filters is particularly likely where a "heat economizer" is used. This device consists of a tortuous passage through which the flue gas is passed in going out to the outer stack, this tortuous passage being located in the path of the return air so that almost all of the heat of the flue gases is given up to the return air before the gases escape to the stack. The economizer is quite often located rather closely to the filters and since, especially when the fan is not running, the economizer may get quite hot, the danger of the filters getting ignited is materially increased.

An object of the present invention is to provide in a heating arrangement employing filter means for cleaning the air, means operative upon the temperature adjacent the filter means rising above a predetermined value to cause said temperature to be reduced.

A further object of the present invention is to provide in a temperature control system having a heater, air circulating means for circulating air over the heater to the space being heated, and filter means for cleaning the air being circulated, means operative upon the temperature adjacent the filter means rising to place the air circulating means in operation.

A further object of the present invention is to provide in a system such as set forth in the previous object, means for placing the heater burner out of operation when the filter temperature rises to a still higher value.

Other objects of the present invention will be apparent from a consideration of the accompanying specification, claims and drawings.

In the drawings, certain specific embodiments of my invention are illustrated in order to make possible a more complete understanding of the present invention.

In the drawings.

Figure 1:
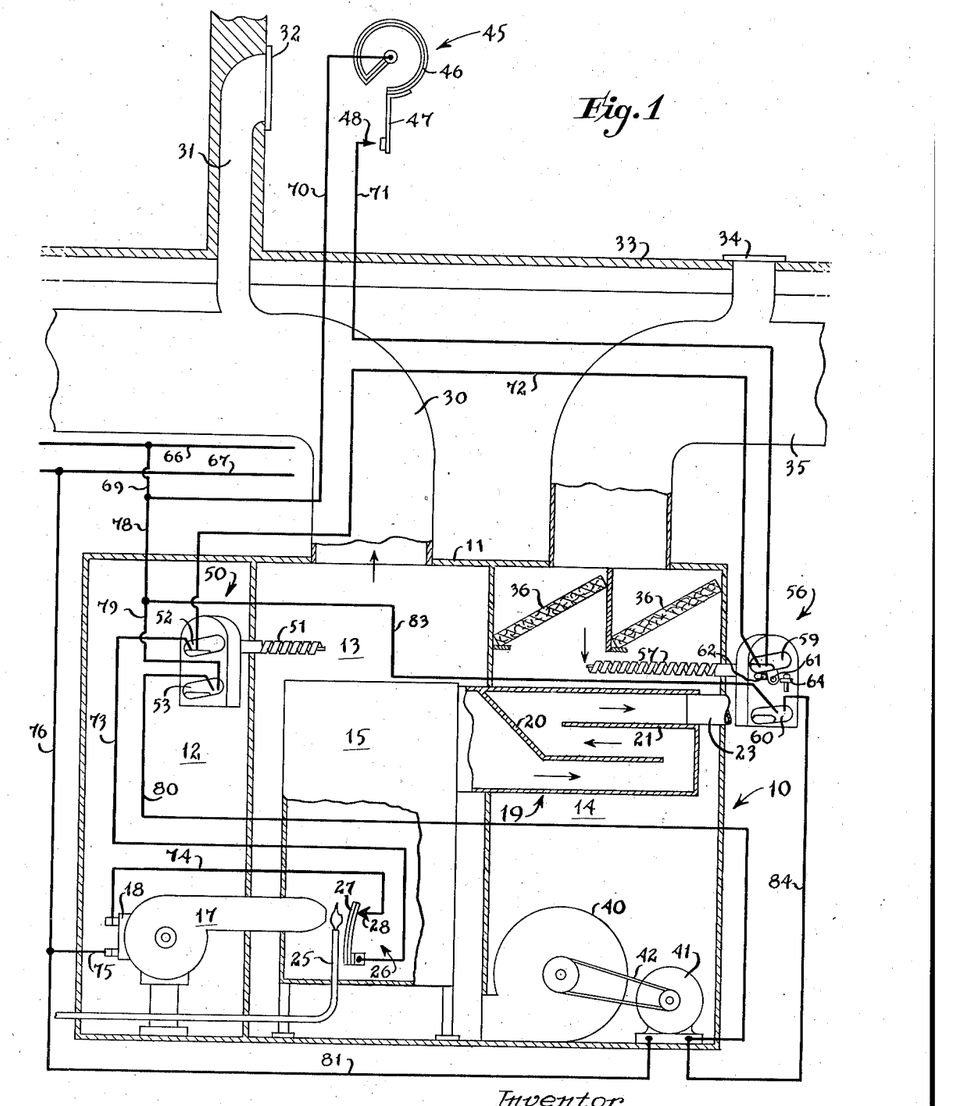
Figure 1 is a schematic view of a furnace fan system showing the various control instruments in highly simplified form.

Description of Figure 1 species

Referring to Figure 1 of the drawings, a furnace unit is designated generally by the reference numeral 10. This unit consists of an outer casing 11 which may be formed of sheet metal. This casing is divided into three compartments 12, 13 and 14. The compartment 12 houses a burner motor and certain of the control apparatus. The compartment 13 houses the furnace proper 15 and provides a path for the air heated by the furnace. The compartment 14 serves to lead the cold air to the blower and through this compartment, the economizer extends.

As previously indicated, the furnace proper is designated by the reference numeral 15. An oil burner 17 has its nozzle extending into the furnace 15. This burner comprises the usual motor 18, only the terminal plate of which is indicated in the drawings.

The economizer is indicated by the reference numeral 19. Due to partitions 20 and 21 built therein, the gases follow a tortuous path as indicated by the arrows on the drawings before entering the stack 23. Thus, in order to reach the stack, the flue gas first has to pass underneath partition 20 to the outer end of the economizer, then between partitions 20 and 21 to the inner end of the economizer and then above partition 21 to the stack 23. In passing through this path, it is obvious that a good deal of the heat of the flue gas will be given up to the surrounding walls.

Associated with the oil burner is a pilot burner 25. The pilot burner serves to ignite the vaporized oil as it issues from the burner nozzle. Associated with this pilot is a thermostatic switch 26 which functions as a safety pilot thermostat. This switch comprises a bimetallic member 27 adapted to engage with fixed contact 28. So long as the pilot is ignited, the bimetallic element 27 is deflected as indicated in the drawings so that it is in contact making engagement with contact 28.

The warm air heated by the furnace proper 15 is passed out through the compartment 13 into a warm air duct 30. Extending from this duct 30 are various branches, one of which is designated by the reference numeral 31. These branches lead to registers 32 located in the space being heated. Located in the floor 33 of the space being heated are cold air registers 34. These cold air registers all communicate with a main return air duct 35. This duct 35 leads into the compartment 14.

Located in this return air compartment 14, as previously stated, are filters 36. These filters serve to catch any foreign material in the air drawn from the rooms. By reason of these filters, the air circulated to and from the rooms is constantly being cleaned. Also located in compartment 14 is a fan designated by the reference numeral 40. This fan serves to force air entering the cold air compartment 14 into the warm air compartment 13 and thence out through the warm air duct to the various rooms. The fan is driven by a motor 41 through a belt 42 or other similar device.

Located in the space being heated is a room thermostat generally designated by the reference numeral 45. This room thermostat comprises a bimetallic element 46 to which is secured a contact arm 47. This contact arm 47 is adapted to engage with a fixed contact 48. The bimetallic element 46 is so arranged that upon a temperature fall, contact arm 47 is deflected to the left. Room thermostat 45 functions as a primary control.

Responsive to the temperature above the furnace 15 or, in other words responsive to the bonnet temperature, is a thermostatic device 50. This device comprises a bimetallic element 51 which is adapted to actuate a pair of mercury switches 52 and 53. This thermostatic device may be of any well known type of construction wherein a single thermostatic element successively actuates a plurality of mercury switches. It will be noted that mercury switch 52 is in its contact making position and mercury switch 53 is in its contact open position. A temperature rise causes these switches 52 and 53 to be tilted in a clockwise direction. Upon sufficient temperature rise, switch 53 will first be made and after the bonnet temperature has risen to a very much higher value, switch 52 will be opened. The switch 53 functions as a fan switch and the switch 52 as a high limit switch. Normally, the high limit switch 52 is not moved from its circuit making position.

Adjacent the filters is a thermostatic device 56. This device is provided with a bimetallic element 57 which is adapted to actuate two mercury switches 59 and 60. Mercury switch 59 is pivotally mounted at 61 at a point considerably beneath its center of gravity. It is adapted to be engaged by a movable pin 62 operated by the bimetal, the bimetal moving this pin to the right upon a temperature rise. If this temperature rise continues sufficiently far, pin 62 will tilt the switch past horizontal position at which time it will fall quickly in a clockwise direction. Once the switch 59 has tilted over center, it will be obvious that it can no longer be returned by the thermostatically operated pin 62. To return the switch 59, a stop or a plunger 64 is provided. This plunger may be manually pushed upwardly to tilt the switch 59 back over center so that it is again in engagement with the pin 62. This plunger 64 further serves to limit the clockwise movement of switch 59 when tilted over center by the action of pin 62. Switch 59 functions as a high limit switch and the previously described action wherein it is tilted over center is for the purpose of preventing this switch being reclosed until the operator has had a chance to inspect the equipment. The other switch 60 is a fan switch and is always under the control of the bimetallic element 57. Switch 60 is adapted to be closed at a lower temperature than that at which the limit switch 59 is opened.

Power for operation of the system is obtained from line wires 66 and 67 which lead to any suitable source of current (not shown)

*Operation of Figure 1 species*

Let it be assumed that the pilot burner 25 is properly ignited and that the temperature in the space being heated drops to a point where engagement of switch arm 47 of room thermostat 45 is effected with contact 48. A circuit will then be established to the burner motor as follows: from line wire 66 through conductors 69 and 70, bimetallic element 46, contact arm 47, contact 48, conductor 71, limit switch 59, conductor 72, limit switch 52, conductor 73, bimetallic element 27, contact 28, conductor 74, burner motor 18 and conductors 75 and 76 to the other line wire 67. The energization of burner motor 18 will cause vaporized oil to issue from the burner nozzle, this oil being ignited by the pilot burner 25.

The operation of the oil burner causes the furnace 15 to be heated up so that the temperature in the bonnet above the furnace 15 begins to rise. After the temperature has risen to a certain point, the bimetallic element 51 is deflected sufficiently to cause fan switch 53 to be tilted in a clockwise direction sufficiently to cause closure of its contacts. As soon as this takes place, the following circuit is established to the fan motor 41: from line wire 66, through conductors 69, 78 and 79, fan switch 53, conductor 80, fan motor 41, and conductors 81 and 76 to the other line wire 67. This places the fan 40 in operation so that the air heated by the furnace 15 is delivered to the various rooms, the cold air being returned as previously described through the cold air registers 34 and the return air duct 35 to the compartment 14 in which the fan 40 is located. This return air, in passing through compartment 14 is heated by the economizer 19 so that it is "preheated" before entering the warm air compartment 13.

The normal effect of the forced circulation of warm air in the manner described in the previous paragraphs is that the room temperature is quickly raised to the desired value, whereupon thermostat 45 becomes satisfied and the circuit to the oil burner is interrupted. Due to the burner no longer being in operation, the temperature of the furnace 15 and consequently the bonnet temperature quickly begins to fall so that in a short period of time the bonnet temperature is sufficiently low that it is undesirable to circulate the air to the space. As soon as this takes place, the fan switch 53 is opened by bimetallic element 51 and the operation of the fan is terminated. If because of the fact that a drop in temperature adjacent room 45 is due to some abnormal condition such as a window being opened, or if because of an abnormally large heat demand, the operation of burner 17 continues for an unduly long time, the bonnet temperature will rise sufficiently high that limit switch 52 will be actuated to open position. As soon as this takes place, the previously traced circuit to the oil burner is interrupted so that the burner is placed out of operation even though the room thermostat may still be calling for heat. In this manner, it is assured that the furnace temperature will not become excessively high at any time. The limit switch 52 is always under the control of bimetallic element 51 so that as soon as the bonnet temperature has cooled down again, the burner will again be placed in operation. This dual control by the thermostat 45 and the limit switch 52 will continue until the room thermostat is satisfied.

If at any time the pilot burner 25 becomes extinguished, the bimetallic element 27 will be deflected to the left so as to open the safety pilot thermostat. It will be recalled that the burner motor circuit previously traced depended upon the closure of this thermostat. Consequently, so long as the pilot burner is extinguished, it is impossible to cause operation of the oil burner.

The portion of the system whose operation has been described so far is conventional and does not form by itself part of my invention. The operation of the novel feature of the system will now be described. If at any time the fan is not in operation due to the bonnet temperature being too low and the temperature adjacent the filters 36 begins to rise unduly, bimetallic element 57 will cause fan switch 60 to be moved to closed position. This condition may occur under various conditions: thus, if the air in the system is quite cold, it is possible that before the air above the bonnet has become heated sufficiently to cause the fan switch 53 to be closed, the effect of the hot gases passing through the economizer 19 will cause the filters 36 to become unduly heated. If for some reason or other, after the furnace has been in operation, the air is suddenly unduly cooled by the opening of a number of cold air registers causing the fan to be placed out of operation, it is possible for the filters 36 to be heated to a dangerous temperature by the economizer.

When for any of the above reasons, the fan switch 60 is closed in the manner previously explained, the following circuit is established to the fan motor 41: from line wire 66 through conductors 69, 78 and 83, fan switch 60, conductor 84, fan motor 41, and conductors 81 and 76 to the other line wire 67. It will be noted that this circuit to the fan motor is independent of all the other controls so that upon the filter temperature rising unduly high, the fan motor is turned on regardless of the setting of any other control.

Under normal conditions, the energization of fan motor 41 is effective to initiate operation of the fan 40. The circulation of air through the system causes any heat in proximity to filters 36 to be carried away and circulated through the system. Thus under normal circumstances, the closing of switch 60 will almost immediately cause the temperature adjacent to the filters 36 to drop to a safe point. If, however, the reason for the temperature adjacent the filters 36 rising to the undesirable high value was that for some reason or other the fan or its associated apparatus was inoperative, the temperature adjacent the filters 36 will continue to rise in spite of the closure of fan switch 60. The fan 40 can be rendered thus inoperative very readily by reason of the belt 42 breaking. It is also possible for this condition to arise by reason of a defect in the motor 41. It is also possible for this high temperature near the filters to arise by reason of a restriction in the circulation, due, for example, to an excessive amount of dirt accumulating in the filters.

If this condition does exist so that the temperature continues to rise as previously explained, the limit switch 59 will eventually be tilted over center. As soon as this occurs, the switch is in its open circuit position. It will be recalled that the circuit traced to the oil burner motor 17 includes in series the limit switch 59. Consequently, as soon as the limit switch 59 has tilted over center, the oil burner is placed out of operation regardless of the setting of any other control. Moreover, due to the fact that this switch when tilted over center is no longer under control of the bimetallic element 57, the burner motor cannot be placed into operation until the system has been inspected by an operator, who can note any defects such as a broken fan belt.

It will thus be readily seen that by means of this system it is assured that the temperature adjacent the filters will never rise to an unduly high value. If the temperature does rise excessively, an energizing circuit will first be established to the fan motor which under all normal circumstances will be sufficient to cause the temperature to be reduced. If for any reason this fails, the burner will then be shut down entirely assuring that the temperature adjacent the filter will decrease.

Figure 2:
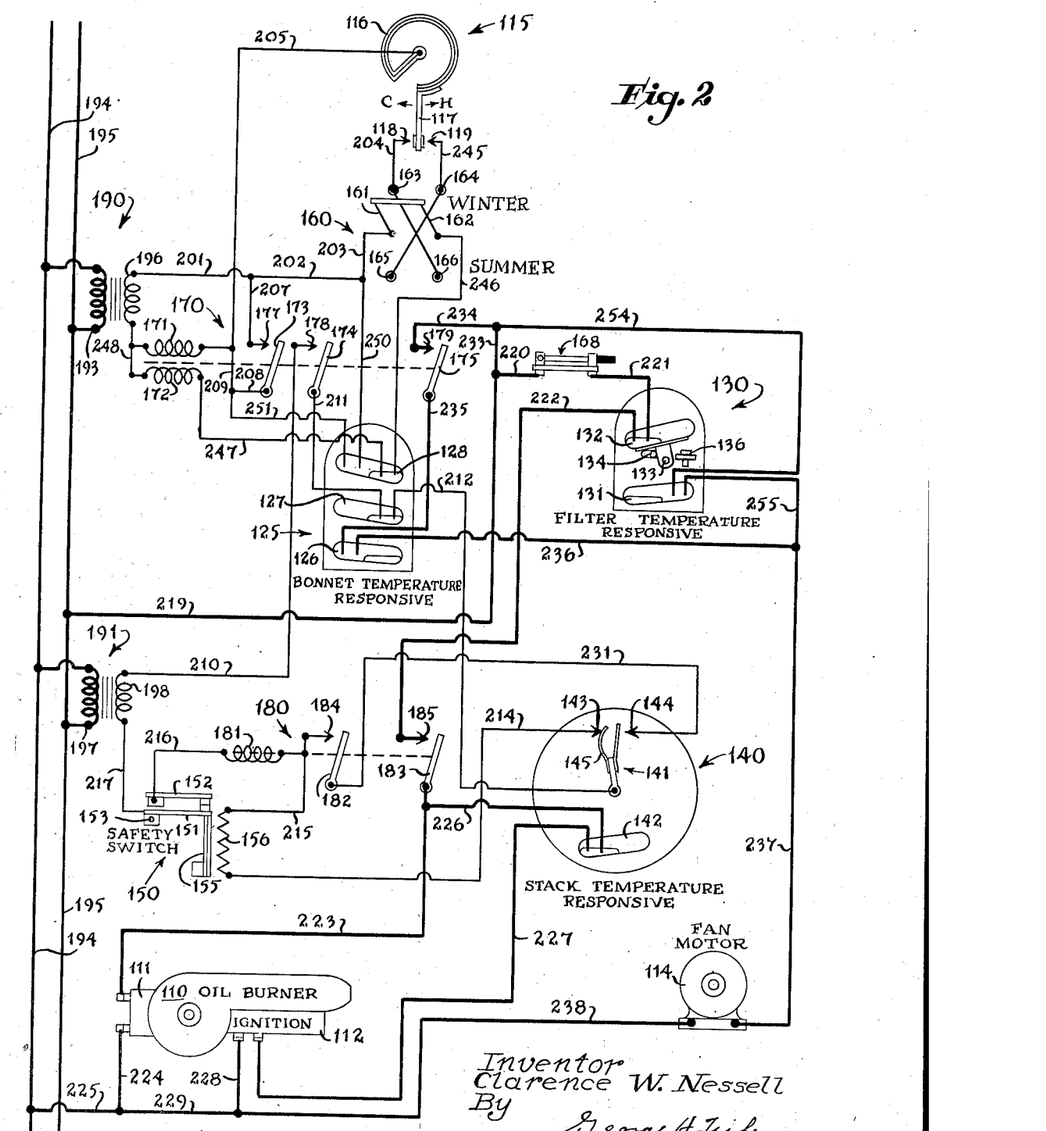
Figure 2 is a schematic view of a control system in a somewhat more highly developed form in which only the control apparatus and its associated wiring is shown.

*Description of Figure 2 species*

The system outlined in the previous portions of this specification, while containing all the essential elements of a simple temperature control system, does not contain certain of the refinements desirable in a warm air heating system control and with which the present invention finds particular utility. In Figure 2, there is shown the various control elements of a more highly developed system.

In Figure 2, the oil burner is designated by the reference numeral 110. The oil burner motor, only the terminal plate of which is shown, is designated by the reference numeral 111. Instead of being provided with a pilot burner igniter as in the Figure 1 species, the present species is provided with an electrical ignition means, which ignition means is designated by the reference numeral 112.

The fan motor in this species is designated by the reference numeral 114. It will be understood that this fan motor operates a fan in the corresponding manner to that in which fan motor 41 in the preferred species operated the fan 40.

A thermostatic switch is designated by the reference numeral 115. This switch comprises a bimetallic element 116 to which is secured a contact arm 117 selectively engageable with contacts 118 and 119. Contact arm 117 is moved by the bimetallic element 116 into engagement with contact 118 upon a decrease in temperature and into engagement with contact 119 upon an increase in temperature. This is designated in the drawings by the legends wherein C represents cold and H hot. A bonnet switching device is generally indicated by the reference numeral 125. This device corresponds to the device 50 of the species of Figure 1. The device generally consists of a bimetallic element (not shown) which actuates three mercury switches 126, 127 and 128. Upon a temperature rise, these switches are all tilted in a counter-clockwise direction. The temperature at which these switches are tilted from one of their circuit controlling positions to another is indicated by the angle at which they are shown in the drawings. Thus, switch 126 is tilted only slightly from horizontal position so that upon temperature rise is the first switch to be moved to its other circuit controlling position, which in the case of this switch is circuit closed position. Switch 127 is the next switch which is tilted to its other circuit controlling position and switch 128 is the last switch to be moved to its other circuit controlling position. The operation of these various switches will be clear from the subsequent description although it may be noted at the present time that switch 126 functions as a fan switch, switch 127 as a high limit switch and switch 128 as an "overrun" switch.

A switching device 130 corresponds to the switching device 56 of the species of Figure 1 and is responsive to the temperature adjacent the filters. This switching device comprises two switches 131 and 132. Switch 131 functions as a fan switch and switch 132 as a limit switch. Upon temperature rise, these switches are moved in a clockwise direction, switch 131 first being closed and at a higher temperature switch 132 being opened. Switch 132 is pivotally supported at a point 133 which is appreciably below the center of gravity of the switch 132. A pin 134 actuated by the bimetallic element associated with the switching device is capable of moving the switch 132 in a clockwise direction. When this movement continues sufficiently far, switch 132 will be moved over center whereupon it will fall in a clockwise direction. A reset plunger 136 is provided to return switch 132 to its closed position when it is so moved over center. This plunger 136 also serves to limit the clockwise movement of switch 132 when moved over center.

A switching device generally indicated at 140 is responsive to the stack temperature. This switching device comprises two switches 141 and 142 actuated by some device responsive to the stack temperature (not shown). Switch 141 comprises a two armed switch blade 145 engageable with contacts 143 and 144. The two arms of switch blade 145 are relatively flexible so that the arm which is in engagement with the associated contact is appreciably flexed. The spacing of these arms is such that upon movement of the switch blade from one contact to the other contact, the engagement of the switch blade with the newly engaged contact is made before disengagement of the switch blade from the other contact is effected. In other words, as commonly referred to in the art, the contacts are "overlapping".

A safety switch is generally indicated by reference numeral 150. This safety switch may be of any suitable type such as that shown in the patent to F. S. Denison No. 1,958,081, issued May 8, 1934. As shown for purposes of illustration in the present case, the switch consists of two switch blades 151 and 152. The switch blade 152 is fixedly mounted while the switch blade 151 is pivotally mounted at 153. The blades are normally held in engagement by a bimetallic element 155 with which is associated a heater 156.

Under certain conditions of operation, the heater 156 is energized. If this energization continues sufficiently long, the bimetallic element 155 is deflected to the right sufficiently that it is moved from under the switch blade 151 permitting the same to drop away from switch blade 152. The safety switch 150 is employed in the system to insure interruption of certain operations if certain other operations have not occurred within a predetermined period of time.

A double-pole double-throw switch is generally designated by the reference numeral 160. This switch comprises the usual two electrically insulated switch blades 161 and 162 and the four contacts 163, 164, 165 and 166. It will be noted that the diagonally opposed terminals 164 and 165 and 163 and 166 are electrically connected so that the switch functions as a reversing switch. The switch is employed to change the control system from winter to summer operation. It will, accordingly, be referred to hereafter as a summer-winter switch.

A simple manual switch is designated by the reference numeral 168. This switch is employed in conjunction with the summer-winter switch for opening the circuit to the oil burner when summer operation is desired.

A relay is designated generally by the reference numeral 170. This relay comprises a pair of relay coils 171 and 172, these relay coils being oppositely wound so as to oppose each other. Associated with the relay coils and operated thereby are three switch blades 173, 174 and 175 which are adapted to be moved into engagement with contacts 177, 178 and 179, respectively. These switch blades are normally biased out of engagement with their respective contacts and upon energization of coil 171 are moved into engagement therewith against the bias.

A second relay is generally designated by the reference numeral 180. This relay comprises a relay coil 181 and a pair of switch blades 182 and 183. The switch blades are adapted to be moved into engagement with contacts 184 and 185, respectively. Like in the previously described relay, the relay arms are biased out of engagement with their respective contacts and are moved into engagement therewith by reason of the energization of the relay coil.

The power for operation of the system is furnished by two step-down transformers. The first of these is designated by the reference numeral 190 and the second by the reference numeral 191. The transformer 190 comprises a line voltage primary 193 which is connected to line wires 194 and 195 leading to a suitable source of power (not shown). The transformer 190 also comprises a low voltage secondary 196. The transformer 191 similarly comprises a line voltage primary 197 connected to the line wires 194 and 195 and a low voltage secondary 198.

*Operation of the species of Figure 2*

The various elements of the system are shown in the position they occupy when the furnace is out of operation. The operation will first be described with the summer-winter switch 160 in its winter position in which switch blades 161 and 162 are in engagement with contacts 163 and 164. As previously explained, bimetallic element 116 is adapted upon a temperature fall to move the switch blade 117 into engagement with contact 118. When this takes place, the following energizing circuit is established to relay coil 171: from the upper terminal of secondary 196 through conductors 201, 202 and 203, switch blade 161, terminal 163, conductor 204, contact 118, switch blade 117, bimetallic element 116, conductor 205 and relay coil 171 to the other terminal of secondary 196. The establishment of this circuit results in the energization of coil 171 and the resultant engagement of switch blades 173, 174 and 175 with their respective contacts 177, 178 and 179.

The engagement of switch blades 173 with contact 177 results in the following holding circuit being established to coil 171: from the upper terminal of secondary 196 through conductors 201 and 207, contact 177, switch blade 173, conductors 208 and 209 and relay coil 171 to the other terminal of the secondary 196. It will be noted that the circuit just traced is independent of the thermostat so that so long as the relay switch blades remain in engagement with their respective contacts, energization of relay coil 171 will be maintained even after switch blade 117 separates from contact 118.

The movement of switch blade 174 into engagement with contact 178 results in the following circuit being established to relay coil 181: from the upper terminal of secondary 198 through conductor 210, contact 178, switch blade 174, conductor 211, limit switch 127, conductor 212, switch blade 145, contact 143, conductor 214, heater 156, conductor 215, relay coil 181, conductor 216, switch blades 152 and 151, and conductor 217 to the other terminal of secondary 198. The establishment of this circuit causes the energization of relay coil 181 with the resultant engagement of switch blades 182 and 183 with contacts 184 and 185.

The engagement of switch blade 183 with contact 185 results in the establishment of the following energizing circuit for the oil burner motor 111: from line wire 195 through conductor 219, conductor 220, manual switch 168, conductor 221, limit switch 132, conductor 222, contact 185, switch blade 183, conductor 223, oil burner motor 111 and conductors 224 and 225 to the other line wire 194.

At the same time, the following circuit is established to the ignition means 112: from line wire 195 through conductors 219 and 220, manual switch 168, conductor 221, limit switch 132, conductor 222, contact 185, switch blade 183, conductor 226, switch 142, conductor 227, ignition means 112, and conductors 228, 229 and 225 to the other line wire 194.

The establishment of the previously traced circuits to the oil burner motor and the ignition means normally results in the burner being placed in operation. This operation of the burner is most quickly reflected in the stack temperature which almost immediately begins to rise. The effect of this is to cause a clockwise movement of both switches 141 and 142. Clockwise movement of switch 142 breaks the circuit controlled thereby, which is the circuit to the ignition means. Consequently, the ignition means is deenergized upon a rise in stack temperature. The moving of switch 141 in a clockwise direction causes the switch blade 145 to first engage contact 144 and to subsequently move out of engagement with contact 143. The moving of switch blade 145 into engagement with contact 144 establishes the following new circuit to relay coil 181: from the upper terminal of secondary 198 through conductor 210, contact 178, relay switch blade 174, conductor 211, limit switch 127, conductor 212, switch blade 145, contact 144, conductor 231, switch blade 182, contact 184, relay coil 181, conductor 216, switch blades 152 and 151, and conductor 217 to the other terminal of secondary 198. It will be noted that the previously traced energizing circuit to relay coil 181 was established through switch blade 145 and the contact 143 and included the heating element 156. It will further be noted that the new circuit does not include the heating element 156. Moreover, the disengagement of switch arm 145 from contact 143 has interrupted the previously traced circuit through this heating element. Consequently, the establishment of this new circuit by reason of the rise in stack temperature has as its effect the termination of the heating of element 156. Accordingly, if this rise in stack temperature occurs within a predetermined period of time, the switch blades 151 and 152 will continue to remain in engagement. In actual practice, this period of time is selected in accordance with the amount of time which is considered safe to operate the oil burner motor without ignition taking place. If this safety switch is opened for any reason, it is indicative of the fact that the system needs the attention of an operator and, accordingly, the switch is so designed that it cannot be restored automatically to closed position after having once been opened.

The operation which has been described so far has resulted in the establishment of combustion and rise in the stack temperature. After the burner has continued in operation for a certain period of time, the bonnet temperature will begin to rise. After this bonnet temperature has reached a predetermined value, the fan switch 126 will be moved to closed position. When this occurs, the following circuit is established to the fan motor 114: from line wire 195 through conductors 219, 233 and 234, contact 179, relay switch blade 175, conductor 235, fan switch 126, conductors 236 and 237, fan motor 114, and conductors 238, 229 and 225 to the other line wire 194.

The operation which has been described so far has resulted in the system being placed in operation with the burner going and the fan motor energized to cause the fan to circulate air through the space being heated. Under normal circumstances, this operation will continue without interruption until the room thermostat becomes satisfied, or in other words, until the thermostat contact arm 117 moves into engagement with contact 119. When this occurs, the following circuit will be established to relay coil 172: from the upper terminal of secondary 196 through conductors 201 and 207, contact 177, switch blade 173, conductors 208, 209 and 205, bimetallic element 116, switch arm 117, contact 119, conductor 245, contact 164, switch blade 162, conductor 246, the right-hand contacts of switch 128, conductor 247, relay coil 172 and conductor 248 to the other terminal of secondary 196.

The energization of relay coil 172 in the manner above set forth results in the coils 171 and 172 both being energized. Since, as previously stated, these coils are oppositely wound so as to oppose each other, the switch arms 173, 174 and 175 are released and are moved by reason of their bias out of engagement with their respective contacts. The release of switch arm 173 from contact 177 deenergizes both of the relay coils 171 and 172, since this switch controls both the holding circuit for relay coil 171 and the energizing circuit for relay coil 172. Accordingly, the relay becomes completely deenergized. The moving of switch blade 174 out of engagement with contact 178 deenergizes the relay coil 181, the energization of which is controlled at all times by switch blade 174 and contact 178. The deenergization of relay coil 181, in turn, terminates the operation of the oil burner. The separation of switch arm 175 from its contact causes the operation of the fan motor to be terminated. Thus, unlike the previously described system, the operation of the fan motor is terminated as soon as the thermostat ceases to call for heat.

The operation described in the previous paragraph is that which normally occurs after the burner and fan have been placed in operation. If, however, the bonnet temperature rises unduly for some reason or other, before the thermostat is satisfied, the high limit switch 127 will be rotated in a counter-clockwise direction sufficiently to open the circuit controlled thereby. Since this switch is always in series with the relay coil 181, the opening of this high limit switch will deenergize the relay coil and will terminate operation of the oil burner. Thus, it is assured that at all times the bonnet temperature will never be allowed to become excessive.

In the present system, a further precaution is provided against excess bonnet temperatures. If for some reason after the thermostat has been satisfied, thus terminating the operation of the fan as well as the burner, the bonnet temperature still continues to rise, the overrun switch 128 will be moved in a counter-clockwise direction sufficiently to cause the mercury element to move from bridging engagement with the right-hand set of contacts into bridging engagement with the left-hand set of contacts. The moving of the mercury out of bridging engagement with the right-hand set of contacts interrupts the circuit to the winding 172 so that even if thermostat blade 117 is in engagement with contact 119, this "bucking" winding 172 cannot be energized. The bridging of the left-hand set of contacts causes the following circuit to be established to the relay winding 171: from the upper terminal of secondary 196 through conductors 201, 202 and 250, the left-hand set of contacts of switch 128, conductors 251 and 209 and relay coil 171 to the other terminal of secondary 196. The circuit just traced is independent of any switches other than the change-over switch 128 so that it is assured that whenever the temperature rises sufficiently high to actuate this switch, the relay coil 171 will be energized. The energization of this relay causes all of the associated switch arms to be reengaged with their respective contacts. Since the switch blade 174 is in series with the limit switch 127 which is open whenever the overrun switch 128 is in the position just described, the closing of switch blade 174 has no effect. The engagement of switch blade 173 with contact 177 establishes a holding circuit for the relay coil in the manner previously traced so as to require that relay coil 172 be energized to again deenergize the relay. The moving into engagement of switch blade 175 with contact 179 reestablishes the previously traced circuit to the fan motor. This places the fan in operation causing the same to circulate the air and carry the excessively heated air in the bonnet out into the room. In this way, the bonnet temperature is quickly lowered causing the switch 128 to move back to the contact making position shown in the drawings, at which time by reason of the engagement of thermostat switch arm 117 with contact 119, relay coil 172 is again reenergized causing the relay to be deenergized in the manner previously set out.

The operation which has been described so far has assumed that the temperature adjacent the filters remains within safe bounds. If the temperature adjacent the filters should rise unduly then the switch 131 is rotated clockwise sufficiently that the mercury element thereof bridges the contacts and the following circuit is established: from line wire 195 through conductors 219, 233 and 254, fan switch 131, conductors 255 and 237, fan motor 114 and conductors 238, 229 and 225 to the other line wire 194. It will be seen that upon closure of this switch by reason of the temperature adjacent the filters rising unduly, the fan motor is placed in operation regardless of the position of any of the other switches. As explained in connection with the previous species, the operation of this fan motor would normally be sufficient to prevent the temperature adjacent the filters from rising any higher. If, however, for some reason or other the fan is not so effective, the temperature adjacent the filters will continue to rise with the result that switch 132 is moved in a clockwise direction to open position. This switch, it will be recalled, is in series with the oil burner so that opening of this switch causes the oil burner to be placed out of operation. Moreover, due to the fact that the switch tilts over center in the manner previously described, it is assured that the oil burner will not again be placed into operation until an attendant has had an opportunity to inspect the system and determine what was the cause of the undue rise in temperature adjacent the filters.

The operation which has been described so far is that occurring when the summer-winter switch 160 is in its winter position. If this switch is moved to its summer position wherein switch blades 161 and 162 are in engagement with contacts 165 and 166 and if the manual switch 168 is simultaneously opened, the control system will operate as an air circulating system during the summer. The summer-winter switch, as previously explained, functions as a reversing switch. Accordingly, the effect of moving this switch from its winter to its summer position is to reverse the connections of the thermostatic contacts 118 and 119 in the control system. The effect of this is that whenever the thermostat 115 goes to its cold position, the relay 170 is deenergized instead of energized as previously and when this thermostatic switch is moved to its hot position, the relay is energized. The energization of the relay 170 during the summer operation causes all of the switch blades to be engaged with their respective contacts in the same manner as previously described. Moreover, each of these switch blades tends to have the same effect as during the winter operation. In other words, the engagement of switch blade 173 with its contact 177 establishes a holding circuit for the energization of coil 171. The engagement of switch blade 174 with contact 178 causes the relay 180 to be energized. The energization of this relay 180 would normally cause the oil burner to be placed in operation. However, due to the fact that the manual switch 168 is open and that this manual switch is in series with both the oil burner and the ignition means 112, it is impossible to start the burner up. The moving of switch blade 175 into engagement with contact 179 causes a circuit to be established to the fan motor, which circuit corresponds to the circuit previously traced in connection with the moving of switch blade 175 into engagement with contact 179. This circuit, as in the previous case, passes through switch 126. Since it would be undesirable to prevent circulation unless the bonnet temperature was quite warm, this switch 126 is set at a relatively low value during the summer operation. In fact, the summer-winter switch may operate in conjunction with the apparatus for adjusting the values at which the various switches 126, 127 and 128 will be operated so that upon the values at which these switches will operate being set sufficiently low, the summer-winter switch is automatically operated. This arrangement is shown in the Patent No. 2,041,645 issued to J. P. Kriechbaum on May 19, 1936. With this lower setting of switch 126, the energization of relay 170 immediately places the fan in operation.

The effect, accordingly, of making the necessary changes in the switches to go from winter to summer operation is that whenever the thermostat goes to its hot position the relay is energized and the fan is, in turn, placed in operation. Whenever the thermostat moves to its cold position, the relay is deenergized placing the fan out of operation. It will thus be seen that the system operates as a circulating system during the summer insuring a circulation of air through the building whenever the temperature is above a desired maximum.

When the various devices are in their summer position, the filter temperature responsive switch 131 still retains control over the fan. Thus, if for any reason whatsoever the temperature adjacent the filter would accidentally rise to a high value, the fan would be immediately turned on to carry the heat away from the filter and reduce the temperature thereof.

Since the oil burner would not be in operation during the summer, the switch 132 plays no part. However, if at any time the manual switch 168 should be accidentally closed, the switch 132 automatically again exercises control over the oil burner in accordance with the temperature adjacent the filter.

It will, accordingly, be seen that in both species a highly efficient and effective temperature control system is provided. In both species, provision is made whenever the temperature adjacent the filters becomes unduly high to first attempt to turn on the fan to carry the heat away from adjacent the filters and if for any reason the temperature still continues to rise, to terminate the operation of the oil burner. In the species of Figure 2, provision is further made for operating the fan under any one of three conditions; the first normal condition, when the room thermostat is calling for heat and the bonnet temperature is within the normal range assumed during operation of the burner; the second, when the room thermostat is satisfied but the bonnet temperature is unduly high; and the third, when the fan would not otherwise be operating because of either the room temperature being satisfied or the bonnet temperature being too low, and upon the temperature adjacent the filter becoming excessively high. Moreover, in this last named system, provision is made for summer operation and during this summer operation to have control of the fan by the device responsive to the temperature adjacent the filter. Thus at all times, provision is made for insuring against any possibility of the filter catching on fire. In this way, an extremely safe system is provided which very effectively overcomes certain of the disadvantages of the prior art systems.

While I have shown certain specific embodiments of my invention, it is to be understood that these are for purposes of illustration only and that my invention is to be limited only by the scope of the appended claims.

I claim as my invention:

1. In a temperature control system, a heater, means for circulating air through an area subject to the temperature changing effect of said heater to a space being heated, filter means located in proximity to said heater for cleaning the circulated air, and means responsive to the temperature of the air adjacent the filter operative upon said temperature rising above a predetermined excessively high value, to cause said temperature to be reduced.

2. In a temperature control system, a heater, means for circulating air through an area subject to the temperature changing effect of said heater to a space to be heated, means responsive to a first condition for controlling the operation of said air circulating means, filter means for cleaning the circulated air, and means responsive to the temperature of said filter means operative upon said temperature rising above a predetermined value to place said air circulating means in operation regardless of the value of said first condition.

3. In a temperature control system, a heater, means for circulating air through an area subject to the temperature changing effect of said heater to a space to be heated, means responsive to a first condition for controlling the operation of said air circulating means, filter means for cleaning the circulated air, and means responsive to the temperature of said filter means operative upon said temperature rising above a predetermined value to place said air circulating means in operation regardless of the value of said first condition and being operative upon said temperature adjacent said filter continuing to rise to cause said heater to assume a heat decreasing condition.

4. In a temperature control system, a heater, means for circulating air through an area subject to the temperature changing effect of said heater to a space to be heated, means responsive to the space temperature for controlling the operation of said heater, means responsive to the temperature of the air adjacent said heater for controlling the operation of said air circulating means, filter means for cleaning the circulated air, and means responsive to the temperature of said filter means operative upon said temperature rising above a predetermined value to place said air circulating means in operation regardless of the value of said temperature of the air adjacent said heater, and being operative upon said temperature adjacent said filter continuing to rise to cause said heater to assume a heat decreasing condition regardless of the space temperature.

5. In a temperature control system, a heater, means for circulating air through an area subject to the temperature changing effect of said heater to a space to be heated, filter means for cleaning the circulated air, means responsive to the temperature of said space controlling the operation of said burner and effective to cause the same to assume either a heat increasing condition or a heat decreasing condition, and means responsive to the temperature of said filter means operative upon said temperature rising above a predetermined value to cause said burner to assume said heat decreasing condition regardless of the temperature of said space.

6. In a temperature control system, a heater, means for circulating air through an area subject to the temperature changing effect of said heater to a space to be heated, filter means for cleaning the circulated air, and means controlling said burner, said means comprising a device responsive to the temperature of said space, a device responsive to the temperature of the air adjacent said heater, and a device responsive to the temperature adjacent said filter means, said burner controlling means being effective to place the burner in operation only when all of the temperatures to which said above named devices are responsive, are below predetermined values.

7. In a temperature control system, a heater, means for circulating air through an area subject to the temperature changing effect of said heater to a space to be heated, filter means for cleaning the circulated air, and means controlling said air circulating means, said controlling means comprising a device responsive to the temperature of the air adjacent said heater and a device responsive to the temperature adjacent said filter means, said controlling means being effective to cause operation of said air circulating means whenever either of the temperatures to which said devices are responsive is above a predetermined value.

8. In a temperature control system, a heater, means for circulating air through an area subject to the temperature changing effect of said heater to a space to be heated, filter means for cleaning the circulated air, means controlling said air circulating means, said controlling means comprising a device responsive to the temperature of said space, a device responsive to the temperature adjacent said heater, and a device responsive to the temperature adjacent said filter means, said controlling means being effective to cause operation of said air circulating means either when the temperature of said space is below a predetermined value and the temperature adjacent said heater is above a predetermined value or when the temperature adjacent said filters is above a predetermined value regardless of the value of said other temperatures.

9. In a temperature control system, a heater, means for circulating air through an area subject to the temperature changing effect of said heater to a space to be heated, filter means for cleaning the circulated air, means controlling said air circulating means, said controlling means comprising a device responsive to the temperature of said space, a device responsive to the temperature adjacent said heater, and a device responsive to the temperature adjacent said filter means, said controlling means being effective to cause operation of said air circulating means when the temperature of said space is below a predetermined value and the temperature adjacent said heater is above a predetermined value, when the temperature adjacent said heater is above a predetermined higher value regardless of the space temperature, or when the temperature adjacent said filters is above a predetermined value regardless of the values of said other temperatures.

10. In a summer-winter furnace fan system, a furnace having a burner, a fan for circulating air through said furnace to a space to be heated, filter means located in proximity to said heater for cleaning the circulated air, a device responsive to space temperature, a device responsive to the temperature adjacent said filter means, a changeover device for transferring from summer to winter conditions, means including said space temperature responsive device operative when said changeover device is in its winter position to cause operation of said fan when said space temperature is below a predetermined value and when said changeover device is in its summer position to cause operation of said fan whenever said space temperature is above a predetermined value, and means including said device responsive to the temperature adjacent said filter means effective to cause operation of said fan whenever said filter temperature is above a predetermined value regardless of said space temperature and regardless of the position of said changeover device.

11. In a furnace fan control system, a furnace, a casing therefor providing paths for heated air and for return air, a fan for circulating air to and from the space being heated, a heat economizer located in the path of the return air and providing a tortuous passage for the products of combustion whereby the heat of the products of combustion is partially given up to the return air to heat the same, filter means also located in the path of the return air in proximity to the economizer, and means operative upon the temperature of the circulated air adjacent the filters rising above a predetermined excessively high value by reason of the heating effect of the products of combustion passing through said economizer to place said fan in operation.

12. In a furnace fan control system, a furnace, a casing therefor providing paths for heated air and for return air, a fan for circulating air to and from the space being heated, a heat economizer located in the path of the return air and providing a tortuous passage for the products of combustion whereby the heat of the products of combustion is partially given up to the return air to heat the same, filter means also located in the path of the return air in proximity to the economizer, and means operative upon the temperature adjacent the filters rising above a predetermined value by reason of the heating effect of the products of combustion passing through said economizer to place the furnace burner in heat decreasing condition.

13. In a furnace fan control system, a furnace, a casing therefor providing paths for heated air and for return air, a fan for circulating air to and from the space being heated, a heat economizer located in the path of the return air and providing a tortuous passage for the products of combustion whereby the heat of the products of combustion is partially given up to the return air to heat the same, filter means also located in the path of the return air in proximity to the economizer, and means operative upon the temperature adjacent the filters rising above a predetermined value by reason of the heating effect of the products of combustion passing through said economizer to place said fan in operation and upon said temperature adjacent said filters rising to a still higher value to place the furnace burner in heat decreasing condition.

14. In a furnace fan control system, a furnace, a casing therefor providing paths for heated air and for return air, a fan for circulating air to and from the space being heated, a heat economizer located in the path of the return air and providing a tortuous passage for the products of combustion whereby the heat of the products of combustion is partially given up to the return air to heat the same, filter means also located in the path of the return air in proximity to the economizer, and means including a temperature responsive element located between said economizer and said filters and operative upon the temperature adjacent the filters rising above a predetermined value by reason of the heating effect of the products of combustion passing through said economizer to place said fan in operation.

15. In a temperature control system, a heater, duct means for circulating air through an area subject to the temperature changing effect of said heater to a space being heated, filter means located in proximity to said heater for cleaning the circulated air, and means responsive to the temperature of the air adjacent the filter operative upon said temperature rising above a predetermined high value to cause an increase in the air circulation through said duct means.

CLARENCE W. NESSELL.